No. 891,072. PATENTED JUNE 16, 1908.
C. H. HUMPHREYS & V. J. SCANTLEBURY.
CONTROLLING MECHANISM FOR MOTOR VEHICLES.
APPLICATION FILED FEB. 2, 1906.
2 SHEETS—SHEET 1.
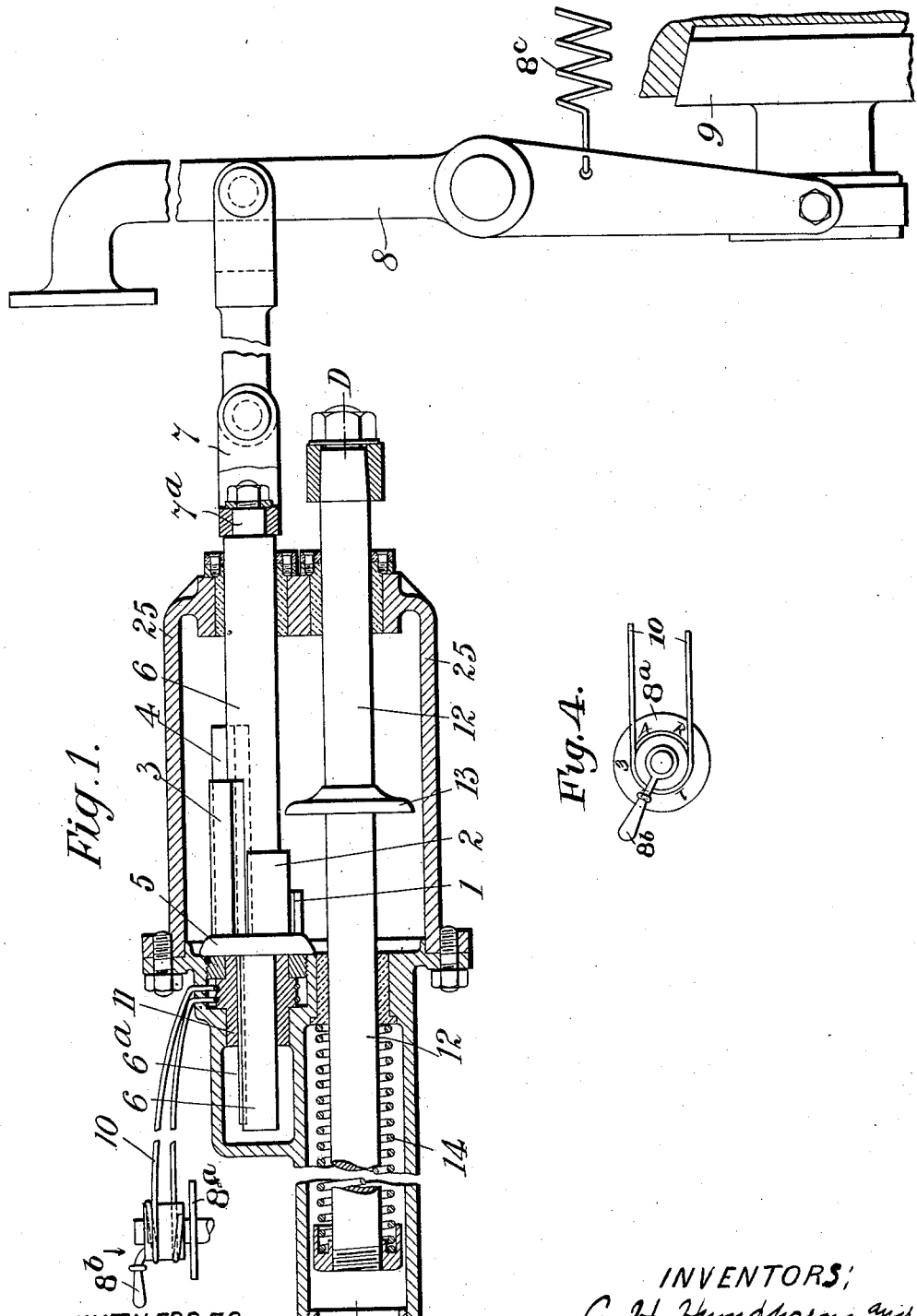
WITNESSES.
INVENTORS;

No. 891,072. PATENTED JUNE 16, 1908.
C. H. HUMPHREYS & V. J. SCANTLEBURY.
CONTROLLING MECHANISM FOR MOTOR VEHICLES.
APPLICATION FILED FEB. 2, 1906.
2 SHEETS—SHEET 2.
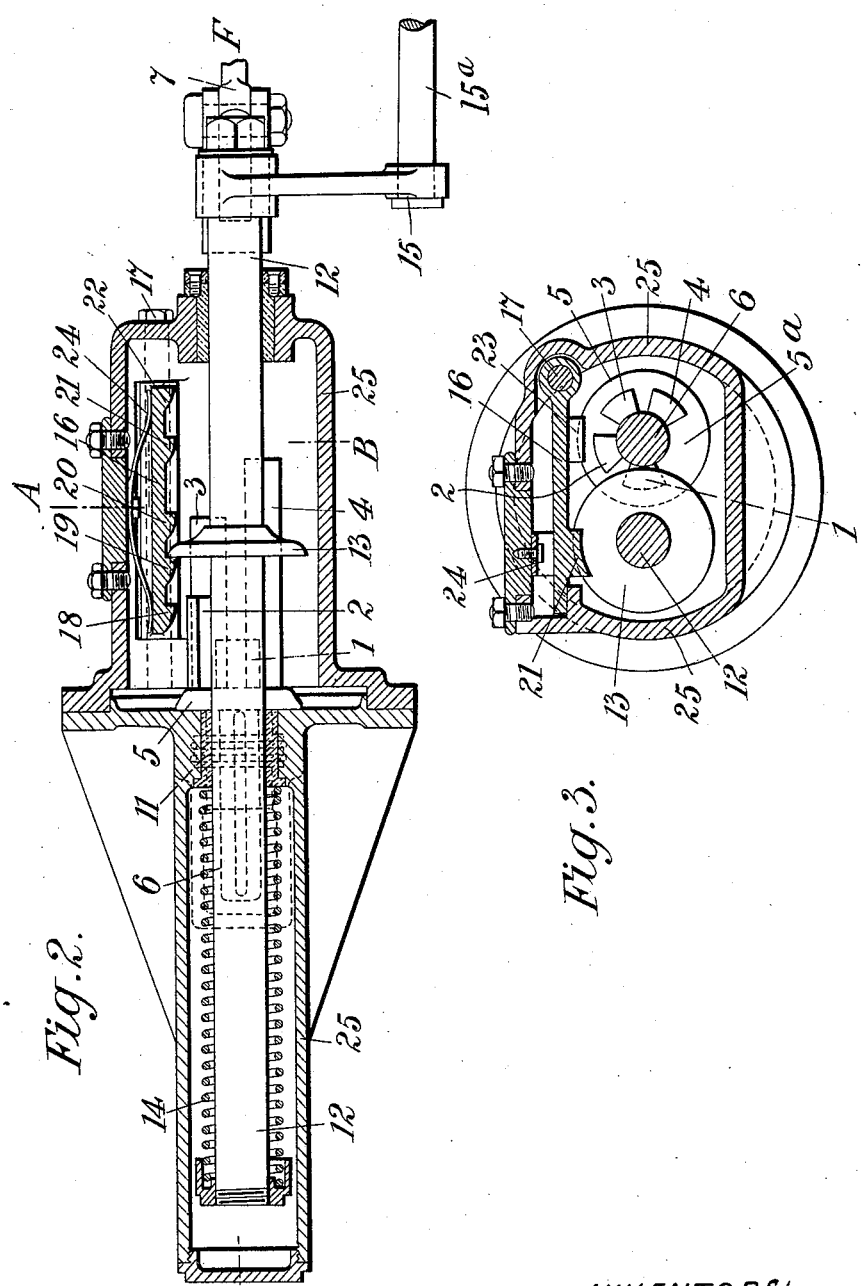
WITNESSES.
INVENTORS:

UNITED STATES PATENT OFFICE.

CHARLES HUMPHREY HUMPHREYS, OF TORQUAY, AND VINCENT JOHN SCANTLEBURY, OF READING, ENGLAND.

CONTROLLING MECHANISM FOR MOTOR-VEHICLES.

No. 891,072.  Specification of Letters Patent.  Patented June 16, 1908.

Application filed February 2, 1906. Serial No. 299,165.

*To all whom it may concern:*

Be it known that we, CHARLES HUMPHREY HUMPHREYS and VINCENT JOHN SCANTLEBURY, subjects of His Majesty the King of England, and residents, respectively, of Torquay, Devonshire, England, and Reading, Berkshire, England, have invented a new and useful Improvement in Controlling Mechanism for Motor-Vehicles, of which the following is a specification.

This invention relates to improvements in controlling mechanism for motor road and certain other propelled vehicles such as those running on rails and having a change speed mechanism. As is well known in such vehicles where two or more speeds are provided care must be taken to put the driving clutch out of action firstly and then to change the speed step by step, that is to change from one speed to the next, and so on by separate operations, since to change from one speed to another with the clutch in, usually results in breakage of the teeth of the gear wheels, and to change from the lowest to the highest, or vice versa, at once may also result in breakage. In such mechanism as hitherto constructed two separate and independent acts are necessary on the part of the operator, before he can change from one speed to another or reverse the one by which he disengages the clutch to throw the driving shaft out of gear, and the other by which he then changes the gear to alter the speed. The first named is usually performed by depressing a lever with the foot, the second by moving a hand lever of a substantial character at the side of the car. In such an arrangement there is nothing to prevent the operator from first changing the speed gear without releasing the clutch.

The present invention is designed to overcome this and consists in providing means whereby the gears cannot be changed without opening the clutch, the act of doing which will alter the gear step by step when so desired in the upward movement after a suitable speed indicator has been previously set. Such desired movement is obtained by means of a slidable part or parts connected with the clutch and with the change speed gear and having on its forward movement the action of a pawl or a ratchet or like step by step movement which movement is utilized by the speed indicating device.

In the accompanying drawings:—Figure 1 illustrates a part sectional side elevation of a construction of controlling mechanism in accordance with this invention. Fig. 2 is a part sectional plan thereof, Fig. 3 is a transverse section on line A B of Fig. 2. Fig. 4 is a side view of the dial end of the speed indicating device, to show the winding of the wires, looked at in the direction of the arrow on Fig. 1.

The mechanism comprises an arm or link 7 attached to or connected with the usual foot lever or pedal 8 controlling the clutch, indicated partly at 9, so that it is moved therewith. This arm or link 7 is in turn connected with a shaft 6 having a slidable movement in a suitable casing.

The shaft 6 is a primary shaft which has cut or formed thereon a number of steps or the like 1, 2, 3, 4, which represent the different speeds, and also a circular collar or shoulder 5 having an inclined face which represents the reversing movement. The shaft 6 obtains its sliding motion in the forward direction by the operation of the pedal 8 and in the reverse direction by means of the usual clutch spring 8$^c$. The shaft 6 has also a rotary movement in both directions which may be conveniently effected by means of bevel or other gearing or by means of a flexible connection such as by wires or the like 10, wound about a drum 11 in opposite directions and having their ends secured to such drum, which is mounted on the shaft 6 upon a feather 6$^a$ so that the shaft is free to slide with respect to the drum, which flexible connections are attached to the lever 8$^b$ of an indicator dial 8$^a$, the whole of which mechanism for rotating the shaft 6 may hereafter be termed a speed indicating device. The rotary movement of the shaft with respect to the link 7 is permitted by the yoke and nut connection 7$^a$.

A secondary slidable shaft 12 is mounted parallel to the shaft 6 and is provided with a collar 13 or other suitable projecting part which is adapted to engage the steps 1, 2, 3, 4, on the shaft 6 whereby the shaft 12 is actuated in one direction, movement in the reverse direction being performed by a spring 14. This shaft 12 is connected either directly or as shown through the link 15 with the shaft 15$^a$ adapted to carry the speed changing gears in the gear box itself, or may be integral with the shaft carrying the sliding pinions in which case the mechanism may form part of the change speed gear.

Above the shafts 6 and 12 is mounted a ratchet plate 16 preferably hinged as at 17, which plate is provided with a number of teeth or the like corresponding with the number of speeds in the gear box. In the present instance five teeth are shown 18, 19, 20, 21, 22, and these teeth are arranged on the plate 16 so as to project into the path of the collar 13 on the shaft 12 while a further tooth or projection 23 having an inclined face is arranged on the plate 16 nearer to the hinge 17 so as to project into the path of the collar 5 on the shaft 6, which thereby controls the movement of the ratchet plate 16, as will be hereafter more fully explained. The ratchet plate may also be provided as shown with a spring 24 which keeps it in its normal position. The parts may be, as shown, inclosed in the casing 25.

The operation of the device is as follows:— Assuming the teeth 18, 19, 20, 21, 22, of the plate 16 to represent respectively reverse, neutral, first, second and third speeds, and the space 5$^a$ and steps 1, 2, 3, 4, to correspond with the said teeth, then, with the parts in their normal positions as shown in the drawing, the shaft 6 will be at the backward end of its travel, and the collar 13 will be engaged by the neutral tooth 19 of the plate 16. The total travel of the shaft 6 in a forward direction is rather more than the distance between the inclined face on the collar or shoulder 5 and the inclined face of the tooth or projection 23 on the plate 16 and therefore during the latter part of the forward travel of the shaft 6 the ratchet plate 16 will be lifted clear of engagement with the collar 13 on the shaft 12. On depressing the foot pedal 8 to disengage the clutch the shaft 6 will be drawn forward until the neutral step 1 engages with the collar 13 on shaft 12, and on the further depression of the foot pedal to complete the travel of the shaft 6 the inclined face of the collar 5 thereon engages with the tooth or projection 23 and raises the plate 16 about its hinge 17 so that the neutral tooth 19 will be lifted clear of the collar 13 of the shaft 12. When the shaft 6 is in this extreme forward position the steps 1, 2, 3, 4, will each be in advance of the corresponding teeth on the ratchet plate 16, an amount equal to the difference between the total travel of the shaft 6, and the distance between the inclined faces of the collar 5 and the tooth or projection 23, and the relative position of the shaft 12 will depend upon which step on the shaft 6 is put into engagement with the collar 13. On releasing the clutch pedal 8, the clutch spring moves the shaft 6 backwards and the collar 5 becoming disengaged from the projection 23 on the ratchet plate 16 permits the latter to descend when the neutral tooth 19 will catch the collar 13 and prevent the shaft 12 from moving backwards, while the shaft 6 is free to resume its normal or former position.

In going up the speeds, say from neutral to first speed, the indicator 8$^a$ is first set by the lever 8$^b$ to "first speed" thereby turning the shaft 6 round by the flexible connection 1 until the step 2 is brought into the path of the collar 13 of shaft 12. The distance between the step 2 and the engaging edge of the corresponding tooth 20 on the ratchet plate 16 equals the total travel of the shaft 6 less the amount each step on the shaft is in advance of the corresponding teeth on the ratchet plate 16, therefore when the clutch pedal 8 is depressed the shaft 6 will be drawn forward until the step 2 engages with the collar 13 on the shaft 12 and draws it with it up over the tooth 20 of the ratchet plate 16 by which tooth 20 the collar is now held, the relative positions of the steps on the shaft 6 being the same as before, so that the further and remaining travel of the shaft 6 forward, while it makes no difference in the position of the shaft 12, raises the ratchet, by the engagement of the tooth or projection 23 thereon with the collar 5 on the shaft 6, and disengages the tooth 20 from the collar 13, said collar being then held by the step 2 on the shaft 6. In going from "first speed" to second and from second to third, the same operation is performed, the steps and teeth corresponding to such speeds being in turn brought into requisition, to put into operation the various gears they represent in the gear box.

In coming down the speeds say from "first speed" to neutral the shaft 6 is first turned back by the operation of the indicator from "first" to neutral until the step 1 projects into the path of the collar 13 on shaft 12. Then the distance between the step 1 and the tooth 19 of the ratchet plate 16 is, as before, equal to the total travel of the shaft 6 less the amount each step is in advance of its corresponding tooth, so that when the clutch pedal 8 is fully depresed, the step 1 is moved forward the above amount being the remaining travel of the shaft 6, in advance of the tooth 19, the ratchet plate is raised on this latter movement of the shaft 6 as before described, and the tooth 19 freed from engagement with the collar 13 on the shaft 12 which latter then flies back under the influence of the spring 14 until the collar 13 catches the step 1 which has been turned into its path. In the backward movement of the shaft on the clutch pedal 8 being released, the ratchet plate is depressed by its spring as the projection 23 is freed from the collar 5 so that the tooth 19 catches the collar 13 on the shaft 12 holding it, before the step 1 leaves said collar on the return movement of the shaft 6 to its original position, the relative positions of the collar and steps being the same as before.

In going down the speeds, that is from a high speed gear to a lower one, the parts are similarly operated, but the movement may be from the highest to the lowest speeds direct by one setting of the indicator.

It will thus be seen that with the above described arrangement it is possible to both throw out the clutch and change the speed with one operation of the foot or other controlling lever.

The above described controlling mechanism is applicable to any known type of change speed gear requiring a forward and backward movement for its operation whether this movement be obtained in one straight line, as in some gears, or in parallel motions by two or more different operating shafts each shaft having a separate forward and backward movement, which give different speeds, neutral being represented by the middle position of each shaft.

What we claim is:—

1. In a speed controlling mechanism for motor vehicles, the combination of a clutch; a lever controlling the same; a shaft capable of a rotary and a longitudinal movement connected to said lever; means to rotate said shaft; a second shaft capable of a longitudinal movement only and provided with a collar, and means on said first shaft to engage said collar, substantially as described.

2. In a speed controlling device for motor vehicles, the combination of a clutch; a lever controlling the same; a shaft connected to said lever; means to rotate said shaft; a second shaft, provided with a collar; and a plurality of steps on said first shaft corresponding to different speeds and adapted to engage said collar, substantially as described.

3. In a speed controlling device for motor vehicles, the combination of a clutch; a lever controlling the same; a shaft connected to said lever; means to rotate said shaft; a second shaft, provided with a collar; a plurality of steps on said first shaft corresponding to different speeds and adapted to engage said collar; and a ratchet plate 16, with which said collar is adapted to engage, substantially as described.

4. In a speed controlling device, the combination of a clutch; a lever controlling the same; a shaft connected to said lever; a drum; connections between said drum and said shaft for rotating the latter; a second shaft; a collar on the same; and means on said first shaft for engaging said collar and longitudinally moving said second shaft, substantially as described.

5. In a speed controlling device, the combination of a clutch; a lever controlling the same; a shaft connected to said lever; a drum; connections between said drum and said shaft for rotating the latter; a second shaft; a collar on the same; and means consisting of a series of steps, one for each speed, on said first shaft for engaging said collar and longitudinally moving said second shaft, substantially as described.

6. In a speed controlling device, the combination of a clutch; a lever controlling the same; a shaft connected to said lever; a drum, provided with an indicator $8^a$; connections between said drum and said shaft for rotating the latter; a second shaft; a collar on the same; and means consisting of a series of steps, one for each speed, on said first shaft for engaging said collar and longitudinally moving said second shaft, substantially as described.

7. In a speed controlling device, the combination of a clutch; a lever controlling the same; a shaft connected to said lever; a drum provided with an indicator $8^a$; connections between said drum and said shaft for rotating the latter; a second shaft; a collar on the same; means consisting of a series of steps, one for each speed, on said first shaft for engaging said collar and longitudinally moving said second shaft; and additional means with which said collar engages and by which it is moved together with said second shaft in one direction, substantially as described.

8. In a speed controlling device, the combination of a clutch; a lever controlling the same; a shaft connected to said lever; means for rotating said shaft; a second shaft; a collar 13 on the latter; a plurality of steps on said first mentioned shaft for engaging said collar 13; and a pivoted plate 16, provided with ratchet teeth with which said collar 13 engages, substantially as described.

9. In a speed controlling device, the combination of a clutch; a lever controlling the same; a shaft connected to said lever provided with a collar 5; means for rotating said shaft; a second shaft; a collar 13 in the latter; a plurality of steps on said first mentioned shaft for engaging said collar 13; and a pivoted plate 16 provided with ratchet teeth with which said collar 13 engages and with a projection 23 with which said collar 5 engages, substantially as described.

10. In a speed controlling device, the combination of a clutch; a lever controlling the same; a shaft connected to said lever and provided with a collar 5; means for rotating said shaft, consisting of a drum and suitable connections, an indicator $8^a$ on said drum; a second shaft; a collar 13 on the latter; a plurality of steps on said first mentioned shaft for engaging said collar 13; and a pivoted plate 16 provided with ratchet teeth with which said collar 13 engages and with a projection 23 with which said collar 5 engages, substantially as described.

In testimony whereof we have hereunto set our hands in the presence of two subscribing witnesses.

CHARLES HUMPHREY HUMPHREYS.
VINCENT JOHN SCANTLEBURY.

Witnesses:
WILLIAM EDWARD DOUGLAS EWEN,
WILLIAM ALFRED WOOD.